US009213982B2

(12) United States Patent
Allen et al.

(10) Patent No.: US 9,213,982 B2
(45) Date of Patent: *Dec. 15, 2015

(54) METHOD AND SYSTEM OF PROVIDING INFORMATION DURING CONTENT BREAKPOINTS IN A VIRTUAL UNIVERSE

(75) Inventors: Sheila E. Allen, Peekskill, NY (US); Christopher J. Dawson, Arlington, VA (US); Rick A. Hamilton, II, Charlottesville, VA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 483 days.

This patent is subject to a terminal disclaimer.

(21) Appl. No.: 13/588,093

(22) Filed: Aug. 17, 2012

(65) Prior Publication Data
US 2012/0310803 A1 Dec. 6, 2012

Related U.S. Application Data

(63) Continuation of application No. 12/239,378, filed on Sep. 26, 2008, now Pat. No. 8,347,235.

(51) Int. Cl.
*G06T 19/00* (2011.01)
*G06Q 30/02* (2012.01)
*G06F 3/0481* (2013.01)
*G06F 17/30* (2006.01)

(52) U.S. Cl.
CPC ............ *G06Q 30/02* (2013.01); *G06F 3/04815* (2013.01); *G06F 17/30873* (2013.01); *G06T 19/003* (2013.01); *A63F 2300/5506* (2013.01)

(58) Field of Classification Search
CPC .......... G06F 3/04815; G06F 17/30873; A63F 2300/5506; G06T 19/003
USPC ........................................................ 715/848
See application file for complete search history.

(56) References Cited

U.S. PATENT DOCUMENTS

| 6,036,601 | A | 3/2000 | Heckel |
| 6,094,677 | A | 7/2000 | Capek et al. |
| 6,271,843 | B1 | 8/2001 | Lection et al. |
| 6,539,548 | B1 | 3/2003 | Hendricks et al. |
| 6,636,210 | B1 | 10/2003 | Cheng |
| 7,181,415 | B2 | 2/2007 | Blaser et al. |

(Continued)

OTHER PUBLICATIONS

Lennartz, 14 Tab-Based Interface Techniques, http://coding.smashingmagazine.com, Apr. 18, 2007.

(Continued)

*Primary Examiner* — Nicholas Ulrich
(74) *Attorney, Agent, or Firm* — Lisa Ulrich; Roberts Mlotkowski Safran & Cole, P.C.

(57) ABSTRACT

The present invention is directed to a system and method for providing information during content breakpoints in a virtual universe. The system comprises a placement engine configured to detect a content breakpoint within a virtual universe, which is defined as at least one of a login process, a logoff process, a teleportation, a wait state, and during any point where a user changes information streams in the virtual universe. The system also comprises an insertion resolution engine configured to create a list of prioritized information to present to a user within the virtual universe and an information definition engine configured to present the prioritized information to the user of the virtual universe during the content breakpoint.

19 Claims, 3 Drawing Sheets

(56) References Cited

U.S. PATENT DOCUMENTS

| | | |
|---|---|---|
| 2002/0107740 A1 | 8/2002 | Abiko |
| 2003/0051255 A1 | 3/2003 | Bulman et al. |
| 2004/0015608 A1 | 1/2004 | Ellis et al. |
| 2004/0143495 A1 | 7/2004 | Koenig |
| 2004/0148221 A1 | 7/2004 | Chu |
| 2005/0086612 A1 | 4/2005 | Gettman et al. |
| 2005/0179685 A1* | 8/2005 | Kake et al. .................... 345/419 |
| 2006/0111979 A1 | 5/2006 | Chu |
| 2006/0119598 A1* | 6/2006 | Littlefield .................... 345/419 |
| 2006/0230141 A1 | 10/2006 | Willis |
| 2007/0078835 A1 | 4/2007 | Donnelli |
| 2007/0078989 A1 | 4/2007 | van Datta et al. |
| 2007/0176921 A1 | 8/2007 | Iwasaki et al. |
| 2007/0219940 A1 | 9/2007 | Mueller et al. |
| 2007/0291034 A1* | 12/2007 | Dones ........................... 345/427 |
| 2008/0307066 A1 | 12/2008 | Amidon et al. |
| 2008/0318559 A1 | 12/2008 | Porco |
| 2009/0100353 A1 | 4/2009 | Cradick et al. |
| 2009/0299960 A1 | 12/2009 | Lineberger |

OTHER PUBLICATIONS

Ernst, Pop-ups, http://www.smatrcomputing.com, Sep. 2004.

* cited by examiner

METHOD AND SYSTEM OF PROVIDING INFORMATION DURING CONTENT BREAKPOINTS IN A VIRTUAL UNIVERSE

CROSS REFERENCE TO RELATED APPLICATIONS

The present application is a continuation application of co-pending U.S. application Ser. No. 12/239,378, filed on Sep. 26, 2008, the contents of which are incorporated by reference in its entirety herein.

FIELD OF THE INVENTION

The present invention relates to providing information to one or more entities and, more specifically, to a system and method for providing information during content breakpoints in a virtual universe.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example, Shared Space: the VU allows many users to participate at once;
Graphical User Interface: the VU depicts space visually, ranging in style from 2D "cartoon" imagery to more immersive 3D environments;
Immediacy: interaction takes place in real time;
Interactivity: the VU allows users to alter, develop, build, or submit customized content;
Persistence: the VU's existence continues regardless of whether individual users are logged in; and
Socialization/Community: the VU allows and encourages the formation of social groups such as teams, guilds, clubs, cliques, housemates, neighborhoods, etc.

It is beneficial for businesses to reach users with advertisements, announcements, surveys, etc., while the users are participating in a VU. However, it is challenging for businesses to effectively present this information to users because the users are often busy attending to business or social interactions and do not want to be interrupted with advertisements or extraneous information. In addition to not wanting to be interrupted, users do not want unattractive advertisements, signs, announcements, etc., to be located throughout the VU landscape.

SUMMARY OF THE INVENTION

In a first aspect of the invention, a system comprises a placement engine configured to detect a content breakpoint within a virtual universe, which is defined as at least one of a login process, a logoff process, a teleportation, a wait state, and during any point where a user changes information streams in the virtual universe. The system also comprises an insertion resolution engine configured to create a list of prioritized information to present to a user of the virtual universe and an information definition engine configured to present the prioritized information to the user within the virtual universe during the content breakpoint.

In another aspect of the invention, the method comprises detecting a breakpoint, defined as a login process, a logoff process, or a teleportation during a virtual universe session. The method also comprises utilizing an insertion resolution engine to create a list of information to present to a user during the breakpoint and presenting one or more pieces of the information to the user during the breakpoint.

In another aspect of the invention, a computer program product comprising a computer usable medium having readable program code embodied in the medium is provided. The computer program product includes at least one component to: detect when a user changes information streams in a virtual universe; prioritize information to present to the user; and present the prioritized information to the user when the user changes information streams in the virtual universe.

In another aspect of the invention, a method for deploying an application for providing information to users, comprises: providing a computer infrastructure being operable to: ascertain information to display to a user while participating in a virtual universe; prioritize information to display to the user; and display the prioritized information to the user during a login process, a logout process, and/or a teleportation.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates to providing information to one or more entities and, in particular, to a system and method for providing information during content breakpoints in a virtual universe. More specifically, the present invention includes a system whereby information is automatically presented to a user when the user encounters a content breakpoint. A content breakpoint can occur, e.g., when an information stream in a VU changes. Exemplary instances wherein information streams can change include when a user (i) logs into or out of a VU, (ii) is idle for a period of time, (iii) teleports to a different location, etc. The amount of time required for an information stream to change can last several seconds during which information in the form of advertisements, announcements, facts, questions, instructions, etc., can be presented to a user.

For example, a user can decide to "teleport" from a first location to a second location within a VU. During this teleportation, the user is shifted within or between virtual regions, which can take any number of seconds to complete. While the user is waiting for the transportation to occur, information such as an advertisement can be presented to the user. The advertisement may be brief, such as the spoken words, "Buy Computers," or it may be more lengthy, such as a traditional commercial. Since the user is not engaged in business and/or social interactions while waiting for the teleportation to be completed, it is a beneficial time for businesses to effectively present information to users within the VU.

Additionally, the invention also contemplates intelligently providing information to users when a user changes information streams in a VU. Intelligent information placements can be presented to a user by analyzing the location the user's avatar is teleporting from and the location the avatar is teleporting to. Additionally, an analysis of an avatar's inventory and/or an avatar's history within a VU may also be used to intelligently present information to a user during content breakpoints. Accordingly, by using the invention, it is now possible to present targeted information to a user during content breakpoints occurring within a VU.

SYSTEM ENVIRONMENT

Figure 1:
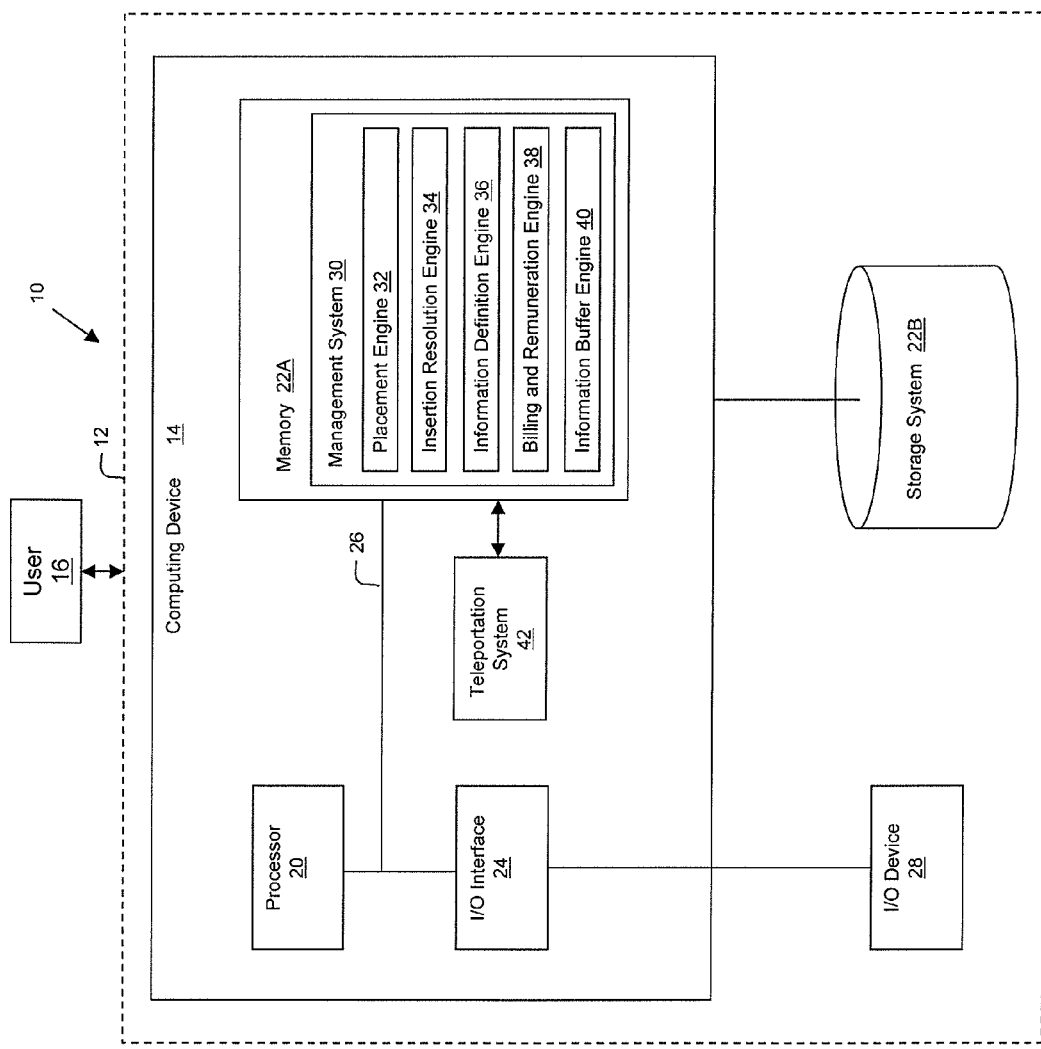
FIG. 1 illustrates a computing infrastructure in accordance with an embodiment of the present invention.

FIG. 1 shows an illustrative environment 10 for managing the processes in accordance with the invention. To this extent, the environment 10 includes a server 12 that can perform the processes described herein. In particular, the server 12 includes a computing device 14, which may be in the form of a VU server system. The computing device 14 comprises a Management System 30, which may be embodied as a VU and stored in memory 22A. The Management System 30 includes Placement Engine 32, an Insertion Resolution Engine 34, an Information Definition Engine 36, a Billing and Remuneration Engine 38, and an Information Buffer Engine 40.

More specifically, the Placement Engine 32 is configured to make computing device 14 operable to detect an action that indicates a breakpoint. A breakpoint can occur when an avatar teleports from a first location to a second location via a teleportation system 42. Breakpoints can also occur during a user login process, a logoff process, when an avatar is in a wait state, or during any point wherein the user changes information streams in a VU. Once a breakpoint is detected, the Placement Engine 32 uses information derived by the Information Resolution Engine 34 to present information to a user 16.

The Insertion Resolution Engine 34 makes computing device 14 operable to create a list of information that can be presented to a user 16 during a content breakpoint. The information in the list can include advertisements, announcements, facts, questions, instructions, etc., which can be stored in a storage system 22B.

The nature and content of the information in the list may depend on any number of factors that are related to the avatar. For example, in embodiments, the Insertion Resolution Engine 34 can analyze an avatar's teleportation history and create a list of information to present to the user 16 based on the analyzed information. The Insertion Resolution Engine 34 can also analyze an avatar's initial location and/or the location the avatar is teleporting to in order to provide targeted information to an avatar. For example, if a user's avatar teleports between two computer stores, the Insertion Resolution Engine 34 can determine what information relates to the computer stores and provide targeted information, such as an advertisement for a new hard drive or an announcement for an upcoming computer game, to the user while the user is teleporting.

The nature and content of the information in a list may also be related to, e.g., one or more objects within an avatar's inventory. For example, if an avatar has a MP3 player in inventory then the Insertion Resolution Engine 34 can determine that the information presented to the user should include, e.g., accessories for the MP3 player from the manufacturer of the MP3 player. Additionally, the Insertion Resolution Engine 34 may also be used to analyze an avatar's history of frequenting a specific shop or area within a VU and provide information relating to the specific shop or area. For example, if an avatar has visited an electronics store a number of times in the last month, information about new items available at that store, sale items, additional store locations, etc., can be presented to the user during a content breakpoint.

Once the list of information is created, the Insertion Resolution Engine 34 can further analyze and prioritize the information in the list. The prioritizing may be performed using one or more of the factors that were utilized to create the list, and/or any number of external factors. Exemplary external factors include, for example: the price the business has to pay to have the information displayed to the user; the history of past information presented to the user; how successful past information presented to a user has been; preferences as to the type of information the user wants to be presented with, etc.

Information at the top of the prioritized list can be presented to a user via the Information Definition Engine 36, which makes computing device 14 operable to define the information presented to a user 16. The information may be presented to the user as text, sounds, words, images, 3-D multimedia, video clips, audio clips, etc., via an I/O device 28 such as a display equipped with a speaker.

The amount of information presented to a user 16 and the way the information is displayed can vary between embodiments. For example, embodiments may present a single piece of information to a user 16 during a content breakpoint while other embodiments present multiple pieces of information to a user 16 during a content breakpoint. This information may be presented consecutively, e.g., a first piece of information is presented for a period of time and is followed by a second piece of information that is presented for a period of time. Information may also be presented at the same time, e.g., by placing multiple pieces of information at different locations on a user's screen. The presentation of multiple pieces of information may be expressed as a "tabbed" list of information from which a user can select any number of pieces of information to view and/or listen. Embodiments may also present details on one or more pieces of information so that the user 16 can select what information the user wants to view. Additionally, embodiments may present the information to users in a popup window, or in a VU frame in the client window, i.e., not in the primary VU viewing area but below, above, or beside it. This allows users to continue to view at least portions of the VU while information is displayed during the breakpoint.

Information may be presented to a user throughout an entire content breakpoint or any fraction thereof. Embodiments may also continue to present information to a user after the content breakpoint has ended. For example, a user may be presented with an audio or video clip during a teleportation and continue to be presented with the clip for a period of time after the new location is rendered.

The types of information and the format in which the information is presented during a content breakpoint can vary. For example, all of the information presented during a content breakpoint may be in the same format, such as an advertisement. Alternatively, the information can be in multiple types of formats, such as advertisements, facts, and/or announcements, etc. Thus, an advertisement could be presented to a user 16 for a period of time, followed by screen containing an announcement about a fundraiser, facts relating to the fundraiser, and instructions on how to get involved in the fundraiser.

The Insertion Resolution Engine 34 can automatically present information to a user 16 without requiring any user 16 interaction. However, embodiments of the Insertion Resolution Engine 34 may be proactive and ask a user 16 if the user 16 would like to view information on a particular subject. For example, when a user 16 teleports using the teleportation system 42, the user 16 can be asked, e.g., "Would you like to hear an advertisement on cameras?", "Press 1 for an advertisement on cameras; press 2 for an advertisement on avatar clothing."

After information is presented to a user 16, the Billing and Remuneration Engine 38 is configured to calculate an amount to bill the entity (e.g., business) that is providing the information. A number of billing models may be implemented by the invention. For example, a business may submit a bid detailing the amount the business will pay for presenting the information. Another billing model may include "flat" billing, wherein a business pays a set rate per unit time, regardless of the number of times their information is viewed within that time period. Data associated with a business's billing model can be represented inside the business's metadata and/or in metadata associated with the information presented to the user.

The Billing and Remuneration Engine 38 is also configured to calculate how much remuneration to provide to the entities involved in presenting the information and/or partaking in the presented information. These entities may include, a VU, a service provider, the user viewing the information, etc. The amount of remuneration remitted to an entity can be based on the amount billed to the business providing information to the users. For example, in embodiments, the remuneration provided to a VU or service provider is a percentage of the amount billed to the business that is presenting the information to the user. The remuneration may be equally distributed between one or more entities or distributed unequally according to predetermined agreements.

Additional systems may also be included in the Management System 30. For example, the Management System 30 can further include an Information Buffer Engine 40, which is configured to queue information obtained from the Insertion Resolution Engine 34 in a buffer or cache. This buffer or cache may be located on a user's computer or in the storage system 22B. Embodiments may also place the buffer or cache in other locations that provide quick access to information when a VU has high bandwidth or computation loads. The information in the buffer or cache can be updated or refreshed at different times, such as when a user starts a VU, exits a VU, is idle in the VU, etc. Additionally, information can also be stored in the buffer or cache when the user is not participating in the VU. The information in the buffer or cache can be queued until a content breakpoint occurs, at which point a VU client accesses the Information Definition Engine 36 and presents the information to a user 16 via the I/O device 28.

For example, when a user logs into a VU the Information Buffer Engine 40 can queue information on the user's computer cache. The cached information can be random and/or associated with areas the user's avatar has frequented, items in the avatars inventory, teleportation locations, etc. The amount of information stored in the cache can vary between embodiments and depends on how frequently the user 16 encounters content breakpoints, the size of the information presented to the user 16 and/or the user's average bandwidth, etc.

The computing device 14 includes a processor 20, the memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. For example, the memory can provide local memory employed during execution of the program codes for engines 30, 32, 34, 36, 38, 40.

Further, the computing device 14 is in communication with an external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

In general, the processor 20 executes computer program code, which is stored in the memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

EXEMPLARY IMPLEMENTATION OF THE SYSTEM OF THE INVENTION

Figure 2:
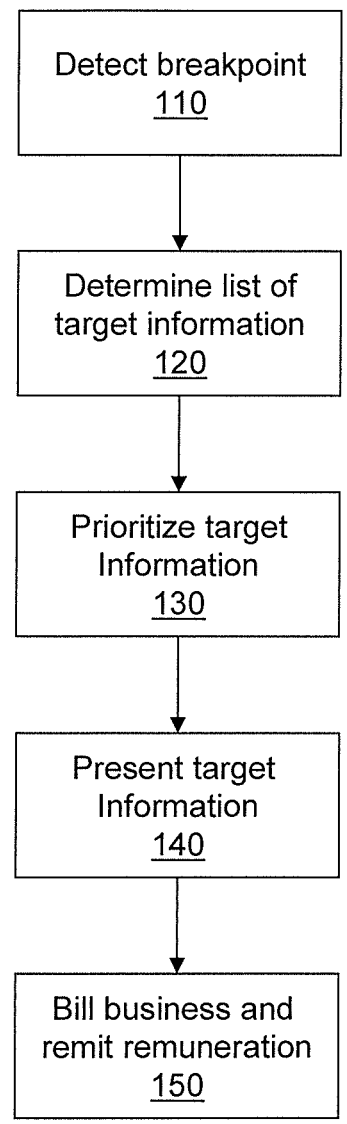
FIG. 2 is a flow chart of steps for implementing aspects of the present invention.

FIG. 2 is flow diagram implementing steps of the invention, which may be implemented in the environment of FIG. 1. FIG. 2 may equally represent a high-level block diagram of the invention. The steps of FIG. 2 may be implemented and executed from either a server, in a client server relationship, or they may run on a user workstation (which can be generally represented in FIG. 1) with operative information conveyed to the user workstation to allow information to be presented to a user during content breakpoints. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 2 illustrates steps for implementing aspects of the present invention. The process begins by detecting whether a content breakpoint has been encountered, at step 110. The process of detecting a content breakpoint may be performed by the Placement System, which is configured to detect content breakpoints by, e.g., tracking the amount of time an avatar has been idle or in a wait state, ascertaining whether a certain event has occurred, such as a login, logoff, or teleportation, etc. The Placement System may utilize any number of additional processes, engines, and/or systems, such as a Teleportation System, to detect content breakpoints.

If a content breakpoint is detected, a list of information is generated to target a user, at step 120. The information can be in the form of advertisements, announcements, facts, questions, instructions, etc. The generation of the list of targeted information can be performed by the Insertion Resolution Engine or the Insertion Resolution Engine in conjunction with a storage system or database, e.g., 22B. For example, data obtained from the storage system or database, such as what objects an avatar has in inventory, may be used by the Insertion Resolution Engine to determine what information may be relevant to the user. This information may then be provided in a list for further use by the processes described herein.

Once a list of information is generated, the list can be prioritized, at step 130. The prioritizing can be performed by the Insertion Resolution Engine using information obtained from the storage system or database. Prioritizing may be preformed by analyzing user preferences, available computational resources, the success of previously presented information, the amount of remuneration associated with information, etc.

One or more pieces of information can be presented to a user using the Information Definition Engine, at step 140. The source of the information can vary between embodiments. For example, embodiments can present information from a prioritized list or a non-prioritized list to the user. Embodiments may also present information to the user from an Information Buffer Engine, which includes a queue of cached or buffered information. The cached or buffered information may include random information, prioritized information, and/or non-prioritized information from the Insertion Resolution Engine.

After the one or more pieces of information have been presented to the user, the business providing the information can be billed and/or the remuneration can be distributed to one or more entities, at step 150. The billing and remuneration processes can be performed by the Billing and Remuneration System. The amount a business is billed may depend on, e.g., the type of information being presented to the user, and the type of business presenting the information, agreed upon fee structures, etc. The amount of remuneration distributed to each entity may depend on existing agreements established between the parties involved in the transaction.

While FIG. 2 includes multiple processes, it should be understood by those skilled in the art that all of the processes do not need to be utilized. For example, random information that does not target a specific avatar can be presented to a user, thereby eliminating steps 120 and 130. Furthermore, embodiments may opt not to include the billing and remuneration processes or may only include a single feature of the billing and remuneration process, such as the billing component.

It should also be understood by those skilled in the art that additional processes may be included in the present invention. Exemplary processes may include, for example: allowing a user to opt out of viewing information during content breakpoints; permitting a user to specify what kind of information should be presented during content breakpoints; allowing a user to skip information once the information has started to be presented; and/or re-presenting information to the user; etc.

Figure 3:
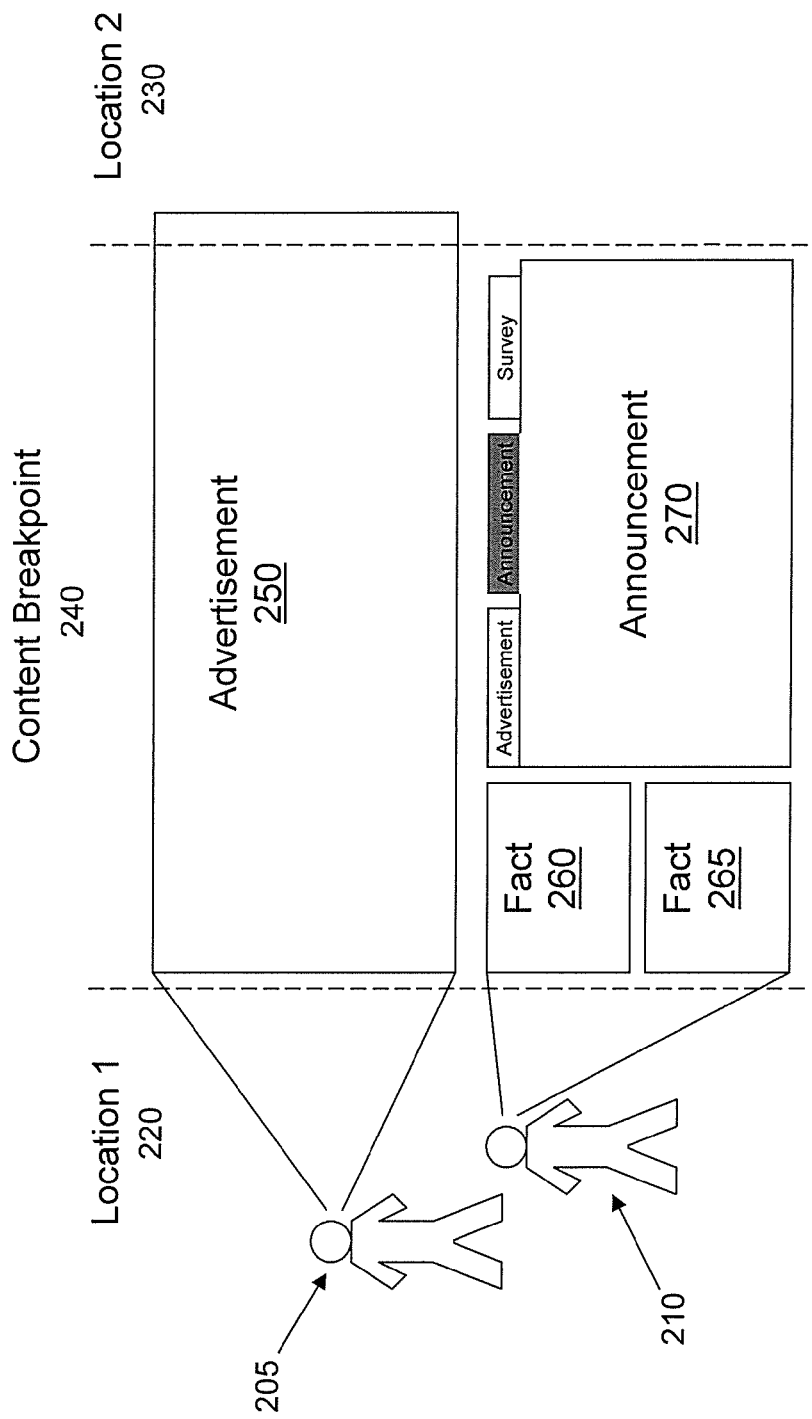
FIG. 3 illustrates an exemplary implementation of the present invention.

FIG. 3 illustrates an exemplary implementation of the present invention. More specifically, FIG. 3 includes avatars 205 and 210, which are teleporting from a first location 220 to a second location 230. While waiting for the features of the second location to load, the avatars 205 and 210 encounter a content breakpoint 240 during which information is presented to the avatars 205 and 210. Depending on the embodiment, the presented information may be the same for each avatar 205 and 210, partially the same, or completely different.

For example, suppose avatars 205 and 210 both work at a virtual technology company and decide to attend a technology conference together. To get to the technology conference the avatars 205, 210 can teleport from a first location 220, their offices, to a second location 230, the conference center. While teleporting, it takes time for the conference center to load. During this downtime, i.e., content breakpoint 240, information can be presented to the avatars 205 and 210 while they wait for the new location 230 to load.

As illustrated in FIG. 3, avatars 205 and 210 can be presented with the same information or different information during content breakpoints 240. For example, the avatar 205 teleporting from the technology company may be presented with an advertisement 250 for a new computer processor or an advertisement for a new car. This advertisement 250 may run throughout the entire content breakpoint 240 or a fraction of the content breakpoint 240. Additionally, embodiments may allow the advertisement 250 to run beyond the content breakpoint 240, i.e., after the new location has finished loading. This may be permitted, e.g., to allow an advertisement to finish running.

The avatar 210 teleporting from the same technology company may be presented with completely different information during the content breakpoint 240. For example, while teleporting, the avatar 210 can be presented with facts 260 and 265 about the weather at the conference center, the number of people already at the conference, etc. These facts 260 and 265 can appear at the same time on different portions of the screen, on different screens, or on the same screen at different times. As well as being presented with facts 260 and 265, additional types of information may also be presented to the avatar 210 during the content breakpoint 240. For example, after presenting the facts 260 and 265, a screen may be displayed that allows the avatar 210 to choose the type of information the avatar 210 wants to see and/or hear. This information 270 may include an advertisement, a survey, an announcement, etc. Each type of information 270 can be represented in a tabbed format, which allows the avatar 210 to select which piece of information 270 the avatar 210 would like displayed.

The type of information presented to the avatars 205 and 210 can be based on the individual avatar's teleportation history, inventory, or even user preferences. For example, a user may indicate a preference toward viewing advertisements about software and hardware products during content breakpoints. Embodiments also permit users to opt out of having information presented to them during content breakpoints.

While the invention has been described in terms of embodiments, those skilled in the art will recognize that the invention can be practiced with modifications and in the spirit and scope of the appended claims.

What is claimed is:

1. A system comprising:
    a placement engine to detect a content breakpoint within a virtual universe, which is defined as at least one of a login process, a logoff process, a teleportation, a wait state, and during any point where a user changes information streams in the virtual universe;
    an insertion resolution engine configured to create a list of prioritized information to present to a user within the virtual universe, wherein the list of prioritized information is based on an avatar's initial location and a location the avatar is teleporting to;
    an information definition engine configured to present the prioritized information to the user of the virtual universe during the content breakpoint as detected by the placement engine; and
    a computing device comprising a processor that executes at least one of the placement engine, the insertion resolution engine, and the information definition engine,
    wherein the list of prioritized information is further based on at least one of the avatar's teleportation history and the avatar's history of frequenting a type of shop or a specific type of area.

2. The system of claim 1, wherein the list of prioritized information is further based on an avatar's inventory.

3. The system of claim 1, wherein the prioritized information is one or more of an advertisement, an announcement, a fact, a question, and an instruction.

4. The system of claim 1, further comprising an information buffer engine configured to queue the prioritized information in a buffer or a cache.

5. The system of claim 1, further comprising a billing engine configured to bill one or more entities for providing information to the user.

6. The system of claim 1, further comprising a remuneration engine configured to provide remuneration to one or more of the virtual universe, a service provider, and the user, based on an amount billed to an information provider.

7. The system of claim 1, wherein the information definition engine is further configured to present the user with one or more pieces of information at a same time in a tabbed list, wherein the tabbed list provides details on one or more pieces of the information.

8. The system of claim 1, wherein the information definition engine is further configured to prompt the user to select a type of information to be presented.

9. The system of claim 1, wherein the prioritized information is presented to the user in a pop-up window outside the virtual universe.

10. A method for deploying an application for providing information to users, comprising:
    providing a computer infrastructure being operable to:
        ascertain information to display to a user while participating in a virtual universe;
        create a list of information;
        prioritize the list of information to display to the user; and
        display the list of prioritized information to the user during at least one of: a login process, a logout process, and a teleportation, wherein the prioritized information relates to an avatar's location prior to the teleportation and the avatar's location after the teleportation,
    wherein the list of prioritized information further relates to at least one of the avatar's teleportation history and the avatar's history of frequenting a type of shop or a specific type of area.

11. The method of claim 10, wherein the computer infrastructure is at least one of: supported, deployed, maintained, and created by a service provider.

12. The method of claim 11, wherein the computer infrastructure is operable to bill one or more entities after the prioritized information is presented to the user.

13. The method of claim 10, wherein the computer infrastructure is further operable to remit remuneration to at least one of a service provider, the user, and the virtual universe.

14. The method of claim 10, wherein the computer infrastructure is operable to queue information in a buffer or a cache and present the queued information when the user changes information streams in the virtual universe.

15. The method of claim 10, wherein the computer infrastructure is further operable to allow a user to opt out of viewing information.

16. The method of claim 10, wherein the displaying of information exceeds a duration of the at least one of: a login process, a logout process, and a teleportation.

17. The method of claim 10, wherein the list of the prioritized information further relates to one or more objects within an avatar's inventory.

18. A method for providing information within a virtual universe comprising:
    detecting a breakpoint, defined as at least one of: a login process, a logoff process, or a teleportation, during a virtual universe session;
    utilizing an insertion resolution engine to create a list of information to present to a user during the breakpoint;
    prioritizing the list of information by analyzing the avatar's location prior to the teleportation and the avatar's location after the teleportation; and
    presenting one or more pieces of the information to the user during the breakpoint,
    wherein the prioritizing the list of information further comprises analyzing at least one of the avatar's teleportation history and the avatar's history of frequenting a type of shop or a specific type of area.

19. The method of claim 18, wherein the prioritizing the list of information further comprises analyzing one or more objects within the avatar's inventory.

* * * * *